(12) United States Patent
Andersen

(10) Patent No.: US 7,831,580 B2
(45) Date of Patent: Nov. 9, 2010

(54) OWNER-BROKERED KNOWLEDGE SHARING MACHINE

(75) Inventor: Richard Park Andersen, San Jose, CA (US)

(73) Assignee: Pandesa Corporation, Los Gatos, CA (US)

( * ) Notice: Subject to any disclaimer, the term of this patent is extended or adjusted under 35 U.S.C. 154(b) by 1669 days.

(21) Appl. No.: 10/520,269

(22) PCT Filed: Oct. 24, 2003

(86) PCT No.: PCT/US03/34021

§ 371 (c)(1),
(2), (4) Date: Dec. 30, 2004

(87) PCT Pub. No.: WO2004/038564

PCT Pub. Date: May 6, 2004

(65) Prior Publication Data

US 2009/0006413 A1 Jan. 1, 2009

Related U.S. Application Data

(60) Provisional application No. 60/421,274, filed on Oct. 25, 2002.

(51) Int. Cl.
*G06F 17/30* (2006.01)

(52) U.S. Cl. .......................... 707/706; 706/12; 706/13; 706/14

(58) Field of Classification Search ................. 707/100, 707/706; 706/12–14
See application file for complete search history.

(56) References Cited

U.S. PATENT DOCUMENTS

| | | | |
|---|---|---|---|
| 2002/0120757 A1 | 8/2002 | Sutherland et al. | |
| 2003/0063771 A1* | 4/2003 | Morris et al. | 382/100 |
| 2003/0200215 A1 | 10/2003 | Chen et al. | |
| 2004/0064704 A1* | 4/2004 | Rahman | 713/182 |

FOREIGN PATENT DOCUMENTS

| | | |
|---|---|---|
| JP | 03-131974 A | 6/1991 |
| JP | 10-083386 A | 3/1998 |
| JP | 2001-209684 A | 8/2001 |

(Continued)

OTHER PUBLICATIONS

International Search Report mailed on Jul. 20, 2004, for PCT Application No. PCT/US03/34021, filed on Oct. 24, 2004, 1 page.
International Preliminary Examination Report completed on Aug. 31, 2004, for PCT Application No. PCT/US03/34021, filed on Oct. 24, 2004, 3 pages.

(Continued)

*Primary Examiner*—John R. Cottingham
*Assistant Examiner*—Noosha Arjomandi
(74) *Attorney, Agent, or Firm*—Morrison & Foerster LLP

(57) ABSTRACT

The invention discloses a system and method for promoting information or knowledge sharing among users registered to a computer network by allowing an information or knowledge owner to locate or directly access private information, to publish information for direct access by knowledge requesters, or to broker information or knowledge with an information or knowledge requester. This invention also discloses a system and method which allow an organization to develop and manage a reward system based on the frequency of an information or knowledge owner's contribution to information or knowledge sharing and the frequency of an information or knowledge requestor's use of shared knowledge.

20 Claims, 17 Drawing Sheets

FOREIGN PATENT DOCUMENTS

| | | |
|---|---|---|
| JP | 2001-222597 A | 8/2001 |
| JP | 2002-063286 A | 2/2002 |
| JP | 2002-149583 A | 5/2002 |
| JP | 2002-183152 A | 6/2002 |

OTHER PUBLICATIONS

English Translation of Japanese Office Action mailed on May 19, 2009, for Japanese Patent Application No. 2004-547200, filed on Oct. 24, 2003, five pages.

* cited by examiner

OWNER-BROKERED KNOWLEDGE SHARING MACHINE

CROSS-REFERENCE TO RELATED APPLICATIONS

This application claims priority to the U.S. provisional patent application Ser. No. 60/421,274 filed on Oct. 25, 2002.

BACKGROUND OF THE INVENTION

1. Field of the Invention

This invention generally relates to information sharing and management technology. More particularly, the invention relates to a system and method for promoting information or knowledge sharing among users registered to a computer network by allowing an information or knowledge owner to locate or directly access private information, to publish information for direct access by information or knowledge requestors, or to broker information or knowledge with an information or knowledge requester. This invention also relates to a system and method which allow an organization to develop and manage a reward system based on the frequency of an information or knowledge owner's contribution to information or knowledge sharing and the frequency of an information or knowledge requestor's use of shared knowledge.

2. Related Art

A statement as to the general structure of knowledge sharing and management systems can summarize the problem with such systems today. These systems are generally designed to "manage" knowledge rather than dynamically share it. As such, these systems are often called "knowledge management systems" and are built to manage a body of information that is collected from individuals within a group or organization. In most cases, the group or organization has some shared domain of responsibility or expertise. The management of the knowledge is generally focused around the central body of information. Software and business processes have been designed to facilitate the posting of information or knowledge objects in digital format to and retrieval from the central body of information, or central knowledge repository. Both the posting and retrieval of information have benefited by the association of descriptive contextual information, or meta-data, about the data stored in such a system. In addition, the security of and appropriate access to the information have benefited from software and business practices designed to manage rules, roles, and access privileges. The use of Internet technologies has enhanced the share-ability of digitized knowledge by collapsing barriers of time and geography.

The premise that brought about these types of centralized knowledge management systems is that some people are knowledge creators (or "knowledge leaders" or "knowledge owners" or "expertise providers") and have information that would be useful one or more times to other potential users ("knowledge seekers" or "knowledge requesters") of the information who could be granted access to the information. I call this the "big bucket approach". As illustrated in FIG. 1A, the big bucket approach assumes that users who voluntarily contribute their knowledge or information content to the big bucket can also retrieve information from the bucket. Essentially, information is obtained either directly or indirectly from the knowledge creators and stored in the central knowledge repository for the knowledge seekers to locate and utilize in the ordinary course of creating work products. The primary objectives for these systems are to have the most relevant and most current information available at all times. A variety of incentive compensation systems have been incorporated along with this approach to encourage the ongoing and continuous population and maintenance of the knowledge repository so that the big bucket is full of imminently locatable, useful information.

Systems utilizing the population and updating of the information en mass ("top down") from central sources such as fileservers, Web pages, etc. or individually by capturing data at the point of origination or utilization ("bottom up"), such as within email systems or in local end-user computer files have been designed.

Similar to the Marxist-Leninist social system, which did not work, big bucket information communism doesn't work well either. The problem with systems employing the big bucket approach is that they do not effectively take into account the human bias not to share information outside of the context of a trust-based relationship. The reality with such systems, as illustrated in FIG. 1B, is that the central bucket is empty relative to the actual digital information that is maintained or possessed directly by the knowledge creators. Extending the bucket metaphor, one can say that the reality is that the distributed individual buckets populated and maintained by individual knowledge owners is where the bulk of actual knowledge desired for a sharing system resides.

What is desired is a multi-domain framework that takes into account, facilitates, and maximizes the access and sharing of knowledge within the context of a trust-based relationship.

What is further desired is an incentive mechanism incorporated with the multi-domain framework to encourage the users to share their work products or other knowledge objects in their possession.

What is further desired is a security mechanism incorporated with the multi-domain framework to ensure privacy and to promote knowledge access and sharing within the context of a trust-based relationship.

What is further desired is an instant message platform incorporated with the multi-domain framework to enable a knowledge owner to provide a knowledge requestor with advice, comments, and substitution of requested resource in a real time manner.

SUMMARY OF THE INVENTION

According to the present invention, a multi-domain framework for promoting the sharing of knowledge within a group or organization is provided which overcomes the problems of prior art methods discussed above. The invention encourages knowledge discovery and sharing by creating a system that allows knowledge owners to easily search their own private repositories of information, to publish information for direct access by knowledge seekers or requestors, or to broker information with knowledge seekers or requestors.

The system for sharing knowledge objects among the registered users of the computer network includes a central knowledge repository and a number of distributed knowledge repositories, each of which is associated with a specific user.

The central knowledge object repository is used for maintaining and updating a collection of published knowledge objects contributed by the users. Any of the users can access any of the published knowledge objects directly by entering a unique user identification, so long as appropriate access privileges have been granted.

The central knowledge object repository is also used for maintaining and updating a collection of listed knowledge objects contributed by the users. Any of the listed knowledge objects can be identified, through the metadata associated with each individual object, but cannot be accessed by any of the users other than the user who contributed the listed knowledge object unless the user who contributed the listed knowledge object authorizes the proposed access.

The collection of listed knowledge objects includes all the listed knowledge objects that exist in all the distributed knowledge repositories.

In the preferred embodiment, the system also includes a mechanism to reward both knowledge-owners and knowledge-requestors for sharing information. This mechanism effectively and for the first time aligns organizational incentives for promoting the sharing and re-use of knowledge with the desire of individuals, based on human nature to manage their digitized personal knowledge closely and to share it within the context of a trust-based relationship.

This invention has numerous real-world applications across industries and organizational structures, and can essentially be used any time people can benefit from sharing knowledge. These include but are not limited to collaboration in the following industries and organizational structures:

general business (e.g. email-based, owner-brokered document, contact, and file sharing);
manufacturing (e.g. collaborative design across any distance or spanning companies);
software development (e.g. source code sharing, testing, bug tracking, information security);
scientific research (e.g. research methods or results sharing);
academic learning (e.g. course material publishing, research results sharing, distance learning);
military (e.g. intelligence gathering, anti-espionage);
financial (e.g. research publishing, research data gathering);
medical (e.g. clinical trials, patient record/clinical case sharing); and
community (e.g. contact sharing amongst groups, photo-sharing).

The foregoing has outlined rather broadly, the more pertinent and important features of the present invention. The detailed description of the invention that follows is offered so that the present contribution to the art can be more fully appreciated.

BRIEF DESCRIPTION OF THE DRAWINGS

For a more succinct understanding of the nature and objects of the present invention, reference should be directed to the following detailed description taken in connection with the accompanying drawings in which.

DESCRIPTION OF THE PREFERRED EMBODIMENTS

Figure 1A:
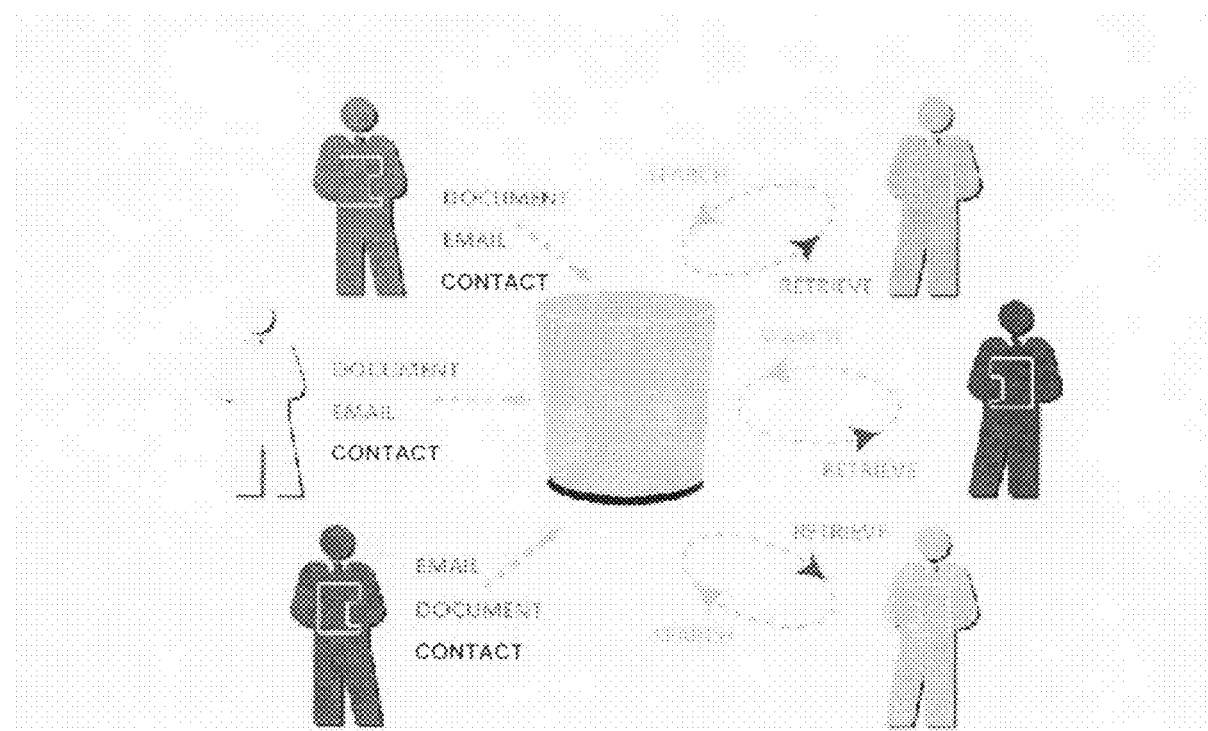
FIG. 1A and FIG. 1B are schematic diagrams illustrating the prior art approaches.
Figure 1B:
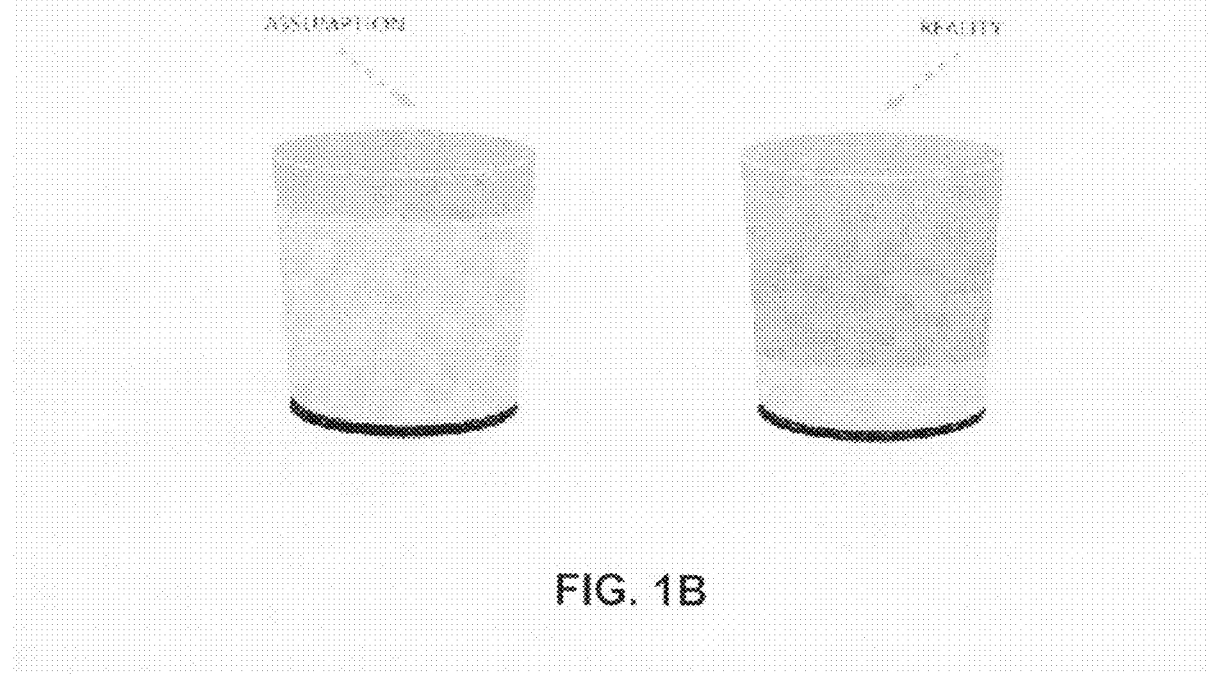
Figure 2A:
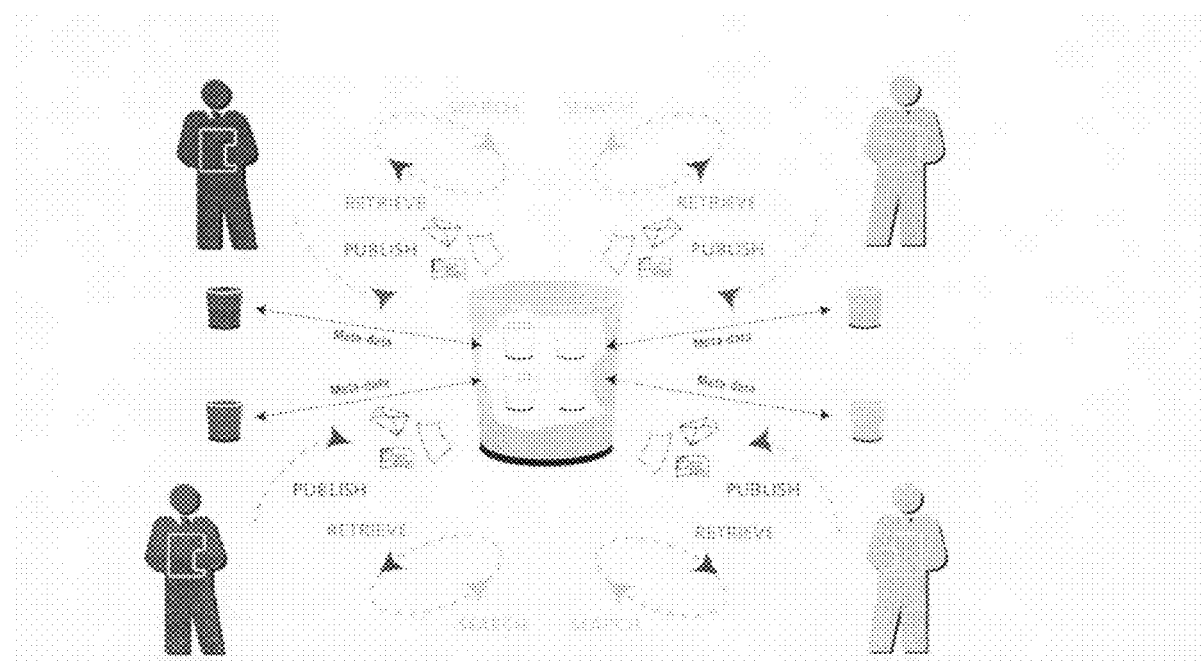
FIG. 2A and FIG. 2B are schematic diagrams illustrating the solution according to the present invention.
Figure 2B:
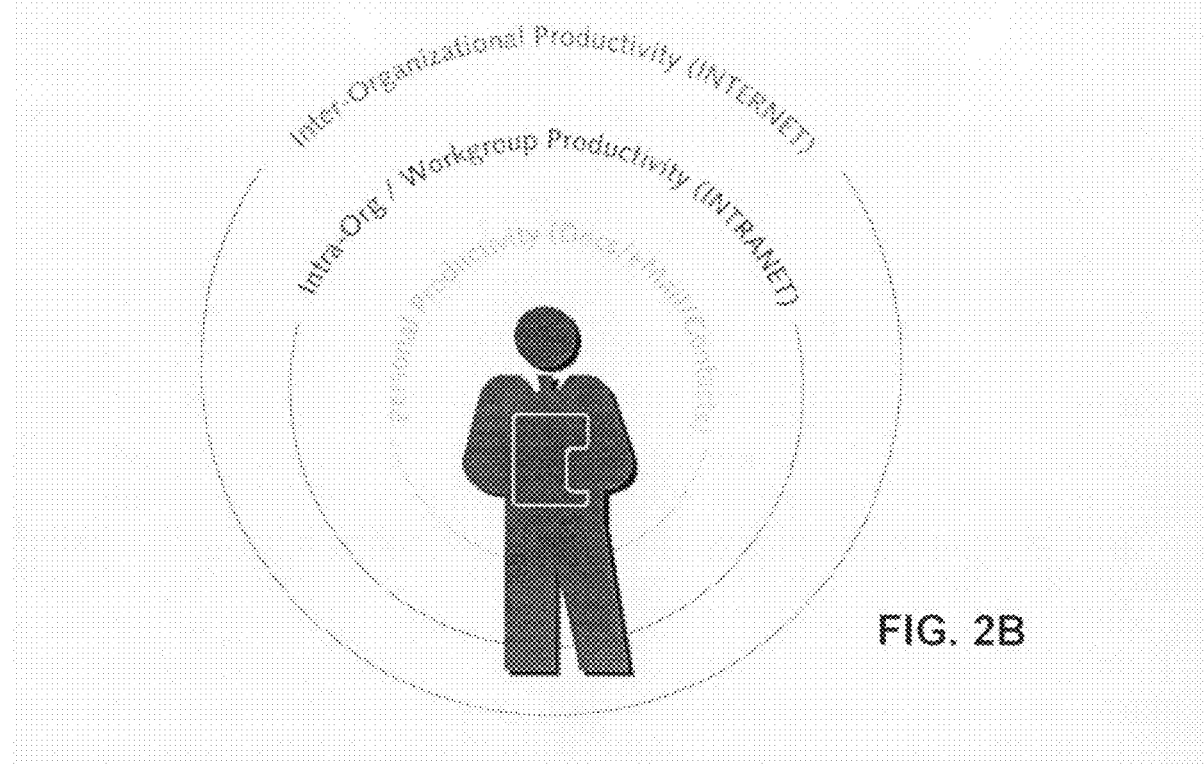

With reference to the drawings, the present invention will now be described in detail with regard for the best mode and the preferred embodiments. In its most general form, the present invention comprises a program storage medium readable by a computer, tangibly embodying a program of instructions executable by the computer to perform the steps necessary to provide a framework, as it is schematically illustrated in FIG. 2A and FIG. 2B, in which knowledge creators can broker information with knowledge seekers and both the knowledge creators and the knowledge seekers can be rewarded for sharing information.

Figure 3:
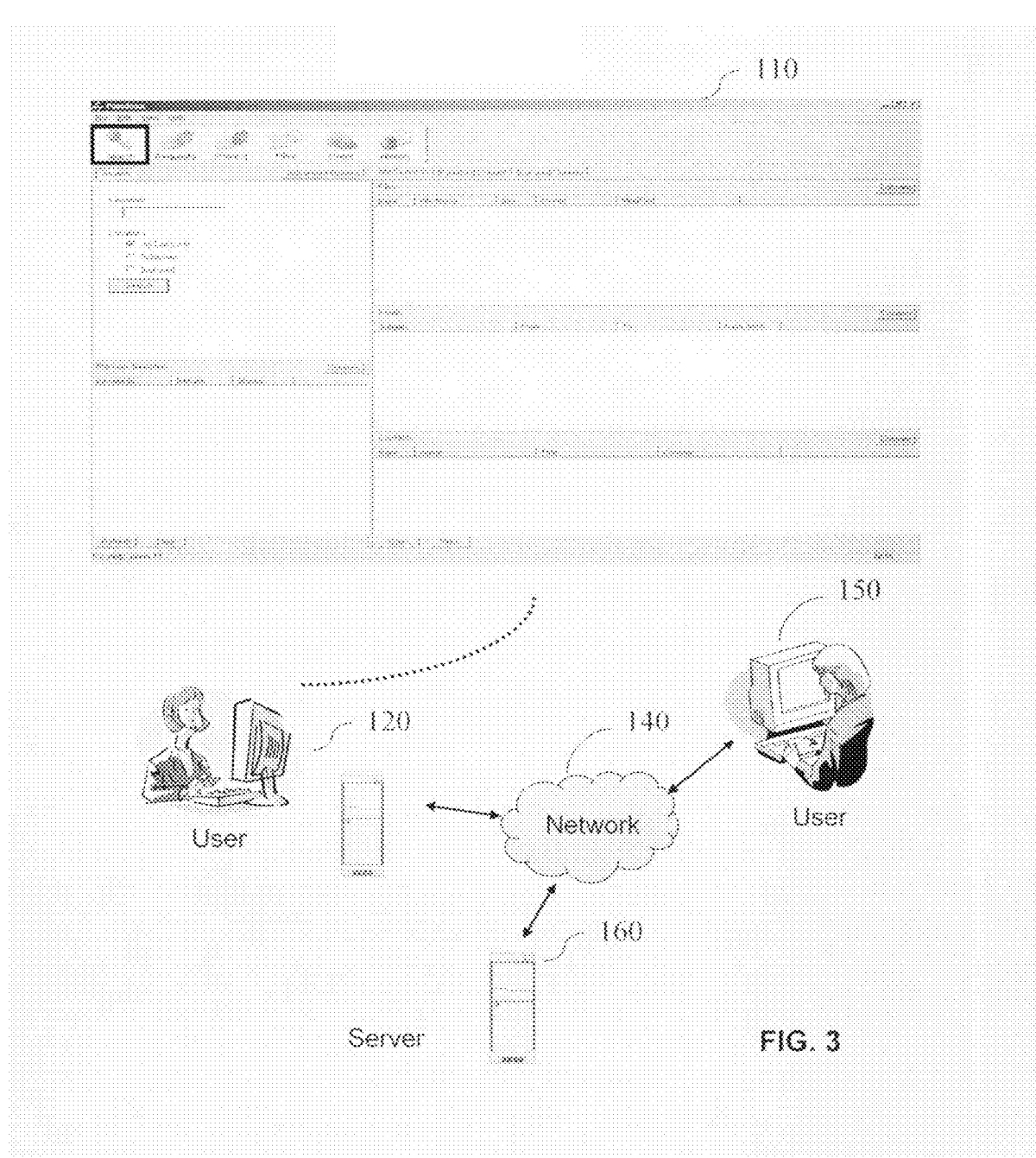
FIG. 3 is a schematic diagram illustrating a network equipped with a knowledge sharing system according to the invention.

FIG. 3 is a schematic diagram illustrating a network including at least two users who constitute a networked community in which a user can be either a knowledge owner (KO) or a knowledge requestor (KR). A user, such as user 120, communicates with other users, such as user 150, using a software application that supports a graphical interface 110. A server 160 provides the knowledge sharing service over the network 140 such as LAN, WAN or the Internet.

Figure 4:
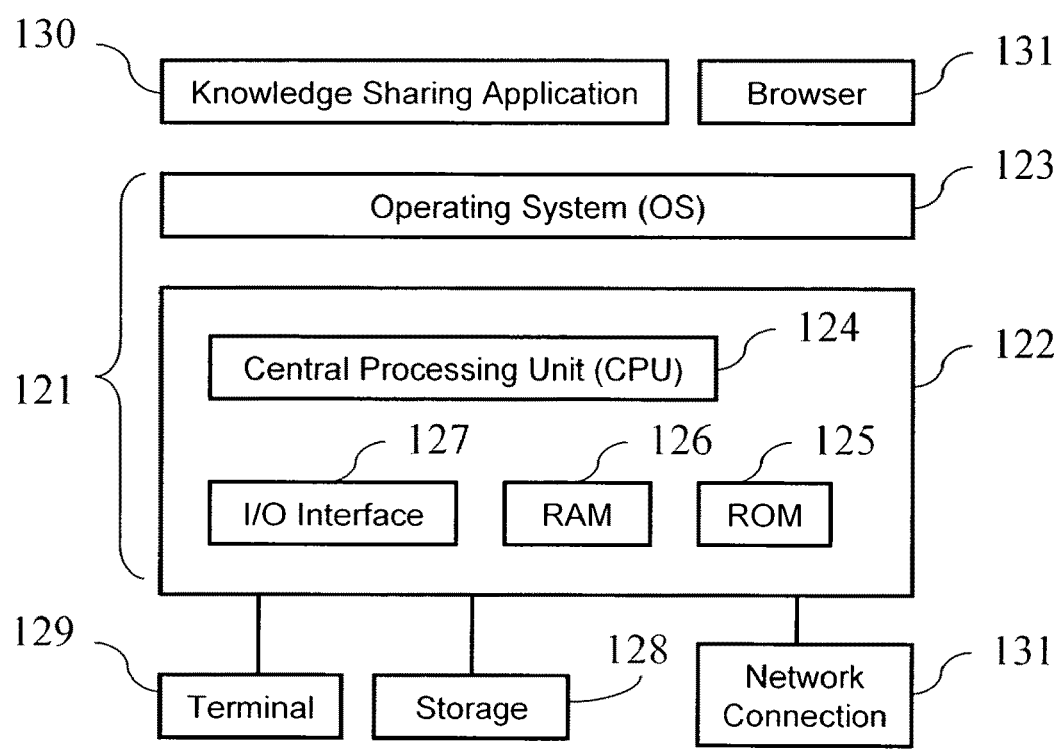
FIG. 4 is a block diagram illustrating a local computer environment wherein the knowledge sharing system according to the invention operates.

The local computer environment wherein the preferred embodiment of this invention operates, as it is illustrated in FIG. 4, includes a computer platform 121, which includes a hardware unit 122 and an operating system 123. The hardware unit 122 includes at least one central processing unit (CPU) 124, a read only random access memory (usually called ROM) 125 for storing application programs, a write/read random access memory (usually called RAM) 126 available for the application programs' operations, and an input/output (IO) interface 127. Various peripheral components are connected to the computer platform 121, such as a data storage device 128, a terminal 129 and a network connection interface 131 such as Ethernet or Fiber Distributed Data Interface (FDDI). The user uses a browser 131 or a similar application to log on the network. The knowledge sharing application 130, which supports the graphical user interface 110 in FIG. 3, runs on the computer platform 121. Those skilled in the art will readily understand that the invention may be implemented within other systems without fundamental changes.

Figure 5:
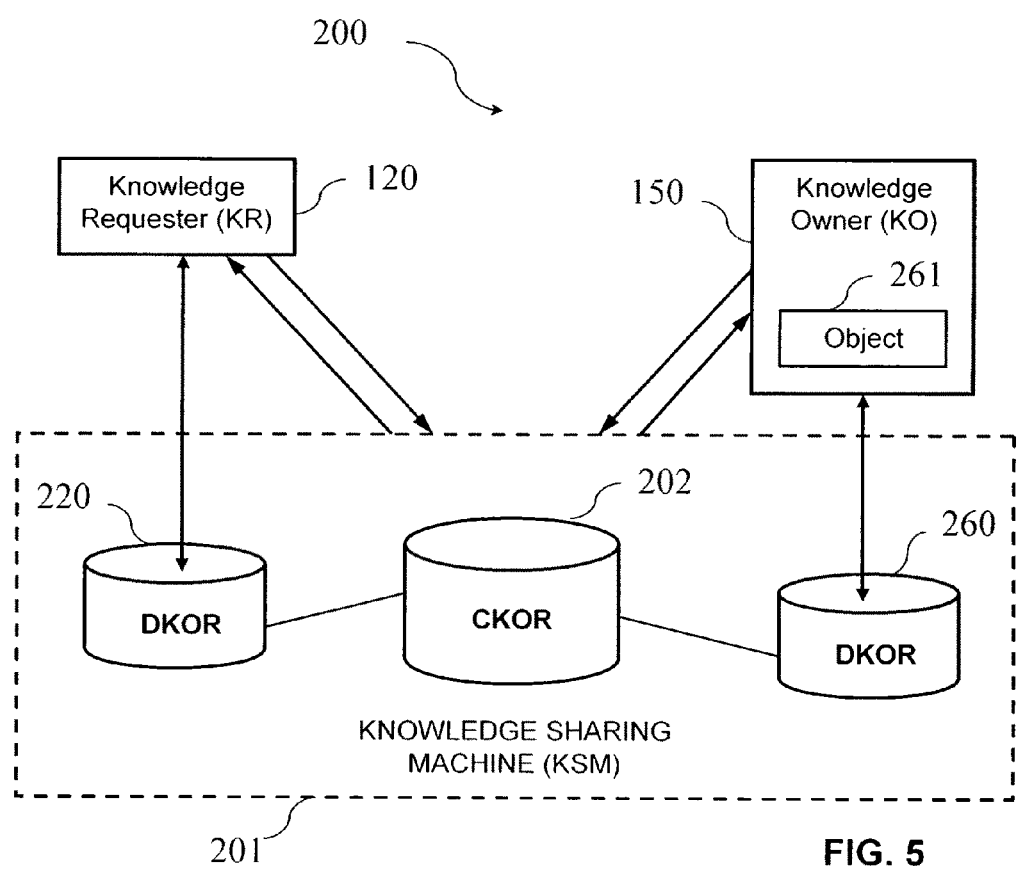
FIG. 5 is a schematic block diagram illustrating a system for owner-brokered knowledge sharing according to the preferred embodiment of the invention.

FIG. 5 is a block diagram illustrating a system 200 for owner-brokered knowledge sharing according to the preferred embodiment of the invention. The system includes at least one knowledge requestor (KR) 120 who initiates a request for information at any time and at least one knowledge owner (KO) 150 who is able to provide information in the form of knowledge objects that are of interest to any KR 120. There is at least one knowledge object 261 associated with each KO 150, which is a unit of analog, digital or digitized information or work product created in the ordinary course of business activity by the KO 150. Both the knowledge owner 150 and the knowledge KR 120 have a distributed knowledge object repository (DKOR), such as DKOR 220 or DKOR 260, which is an individual or personal or private knowledge object repository that stores electronic files, emails, contacts, or other knowledge objects. The distributed knowledge object repository is user-specific. One user cannot access another's knowledge object repository, however, the content in each user's knowledge object repository is searchable or indexable by a non-human agent such as a software application running on the system.

The system 200 also includes a central knowledge object repository (CKOR) 202, which is a central body of digital information which can be deployed as a software application run on the server 160 (see FIG. 3) or stored in a database or managed through peer-to-peer technology to appear as a central body of information to the users of the system. In the preferred embodiment, the central knowledge object repository (CKOR) 202 is part of the knowledge sharing application, called knowledge sharing machine (KSM) 201.

KSM 201 runs on the server 160 in FIG. 3 or through the virtual combination of connected machines using peer-to-peer technology to appear as a central body of information to the users of the system, and includes the user interface 110, shown in FIG. 3, through which users access information. The KSM 201 manages both the CKOR 202 and the DKORs 220 and 260. A unique characteristic of the KSM 201 is that it maintains the continually updated and current directory or index of the contents of the CKOR 202 and the DKORs 220 and 260, which can be described as the collective body of information. The KSM 201, through its various modules and interfaces, facilitates access to and management of knowledge objects based on the type, classification, or domain of information that is stored.

The system 200 comprises the entirety of the system, including the human and system supported processes defined, as well as the operational, administrative, measuring, rewards tracking, and reporting software components managed by the KSM 201.

Figure 6:
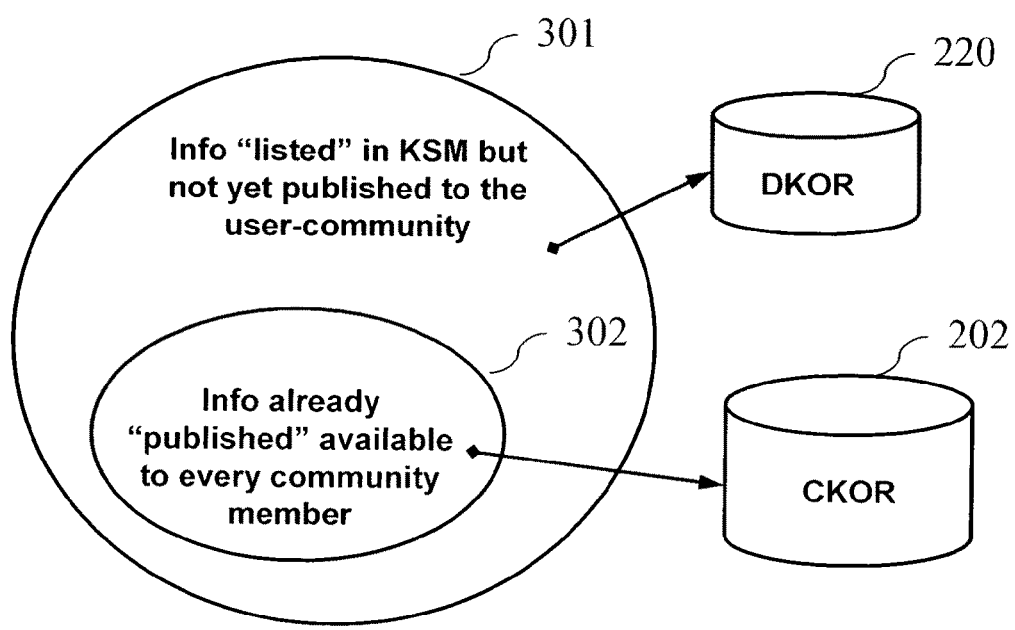
FIG. 6 is a schematic diagram illustrating the relationship between the domain of listed (identifiable but unpublished) knowledge objects and the domain of the published knowledge objects.

FIG. 6 is a schematic diagram illustrating the categorization of the knowledge flowing in the system of FIG. 5. The knowledge is classified "listed" 301 and "published" 302. "Listed" information 301 in this application is defined as knowledge objects (such as documents, emails, contacts, etc.) that are indexed at either the meta-data or full-text level from within DKORs 220/260. In particular, a listed knowledge object means a knowledge object that is listed in, and known to, the KSM 201 but which has not yet been published to all users of the system. The knowledge objects are owned, or created and updated in the ordinary course of business communications by the KO 150 but they have not been published or approved by the KO 150 for direct access through the KSM 201. Access to listed information 301 is managed through a knowledge brokering process which requires the consent of the KO 150 before knowledge objects visible to the KSM 201 from within the DKOR 260 will be made available for evaluation of or delivery to the KR 120.

"Published knowledge" 302 is defined as information that has been authorized by the KO 150 for direct access through the KSM 201 after either passing through the knowledge brokerage process at all or through direct submission by the KO 150 to the CKOR 202. Published information can be shared on a subscription basis so that subsequent revisions and updates to the information can be automatically delivered to the knowledge KR 120 in the future.

The Correlation Index ("CI"), which is used in the system, is a comparison means to indicate the degree of correlation between a request and a knowledge object as represented by the objects data or the data about the object (meta-data). In the case of published information 302, the correlation can be as high as 100% because the information is available to the knowledge requestor 120 directly from the CKOR 202 without human broker interaction. In the case of listed information 301, because the CKOR 202 is a system and not a person, the KSM 201 can identify a very high CI between the request and the result but will not show a 100% correlation. The KO 150, which is the human broker of listed information 301, must be the ultimate determinant of correlation.

The system 200 also includes a comparison measure, referred to as a Relationship Index ("RI"), which is a measure of the strength of a relationship as defined by aggregate interactions (phone, email, meetings) between one person and another. This can be applied to data that is sought by a KR 120. For example, contact data for a sales prospect may reside in more than one DKOR and the KR 120 may want to identify the person within the organization with the strongest relationship with the prospect, in order to obtain the most complete understanding of the prospect's interaction history the organization. This can also be applied to the trust-based relationship that can develop within the KSM 201 between a KR 120 and a KO 150 by measuring searches and approved retrievals of information over time.

The system 200 also includes a knowledge sharing reward tracking module, which is used to track the number of requests for, and the subsequent delivery of, listed or published information from the KO 150 to the KR 120 through the knowledge brokering process or through the automated publishing process. In particular, the tracking module may be configured to track: the number of times that a user discloses a private knowledge object from his private domain to the domain of listed but unpublished knowledge objects; the number of times that a user authorizes other users' access to an unpublished knowledge object; the number of times that a user publishes a knowledge object, either from his private domain or from the unpublished domain, to the published domain; the number of times that a published knowledge object is used by the users other than the user who contributed the published knowledge object; and the number of times that a user requests and uses the knowledge objects originated from other users. The tracked information will be used within a compensation system to reward users, such as employees, for sharing knowledge.

Figure 7:
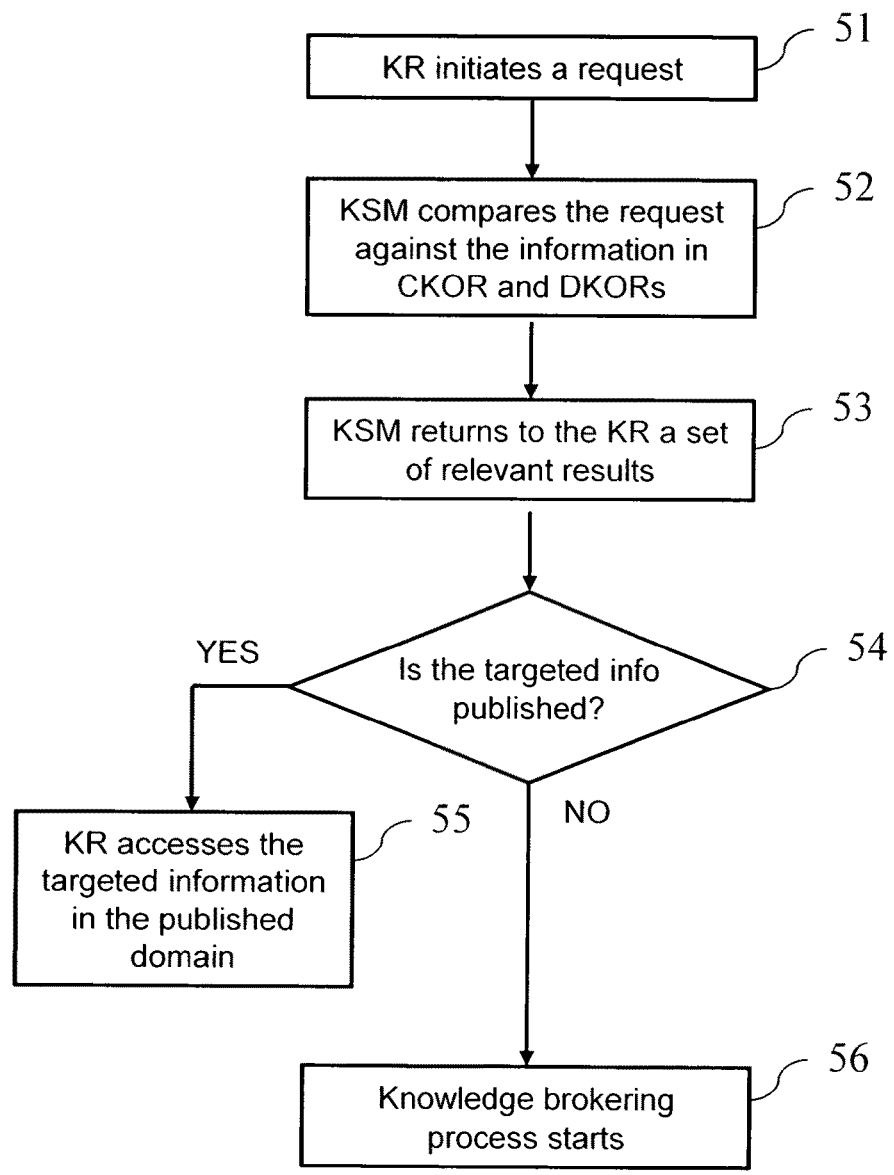
FIG. 7 is a flow diagram illustrating a process for accessing published knowledge objects.

FIG. 7 is a flow diagram illustrating a process for accessing published knowledge objects according to the preferred embodiment. The method includes, but is not limited to, the following human or system supported steps:

Step 51: A knowledge requestor (KR) initiates a search request for information, which could be an outline, a brief, a sample letter, a report, an email, or even a person's contact information including a history of interactions with a contact.

Step 52: Upon receipt of the request, the knowledge sharing machine (KSM) compares the request against the information stored in the CKOR and the DKORs.

Step 53: The KSM returns a set of relevant results, which is one or more results that are correlated with the request, to the KR in a ranked form showing the highest level of correlation between the request and the result set, including both published and listed information (knowledge objects). In the preferred embodiment, a correlation ranking indicator is associated with each returned result so that the user can identify the most relevant result conveniently and accurately.

Step 54: The KR evaluates the result set and determines if any information returned by the KSM is in the published domain.

Step 55: IF the KR decides to obtain the published information, THEN the KR can access the information directly from the CKOR through the KSM so long as the person has appropriate access privileges (departmental, title/role/responsibility, etc.).

Step 56: ELSE IF a piece of listed information is sought by the KR, THEN the KR must access the information from the KO through the knowledge brokering process as illustrated in FIG. 8.

Figure 8:
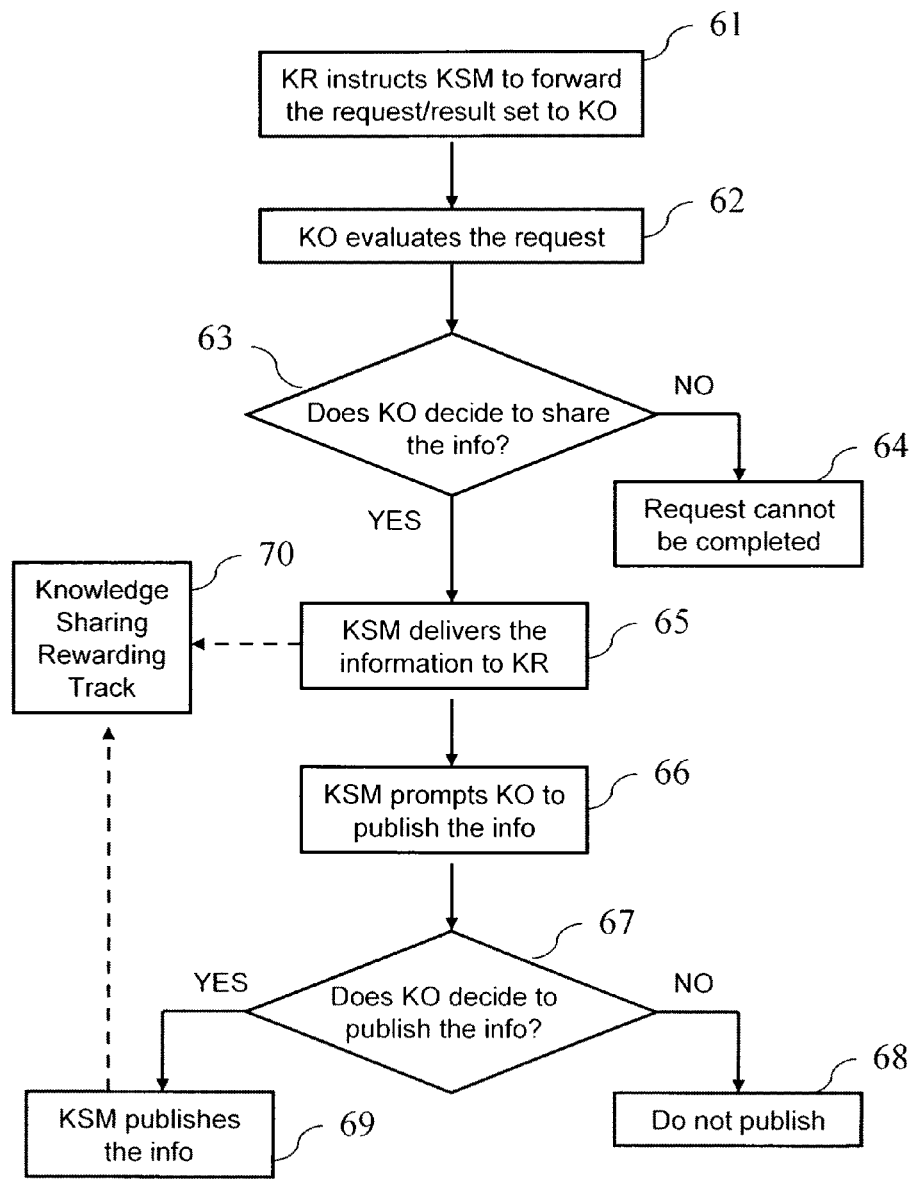
FIG. 8 is a flow diagram illustrating a process for owner-brokered knowledge sharing.

FIG. 8 is a flow diagram illustrating a knowledge brokering process, which comprises the steps of:

Step 61: Via the software user interface, the KR instructs the KSM to send the request along with the associated (by the KSM) individual knowledge object result or results from the result set to the KO. The request includes the statement that the KR is looking for a knowledge object from the domain of the listed information and that the KSM has determined that a knowledge object in the KO's DKOR has a specified correlation or likelihood of being the information sought. In the preferred embodiment, the request is a message automatically generated by the system in response to the KR's command, such as a single click, to send the request to a KO. Also, in the preferred embodiment, the system can be configured so that a request cannot be forwarded to a KO until the search request is sufficiently specific so that it yields a finite, manageable set of results.

Step 62: The KO receives and evaluates the request and the result set from the KSM.

Step 63: The KO decides whether to share the information or not.

Step 64: IF the KO does not agree to share the information with the KR, THEN the KSM sends the KR a notice stating, for example, "Sorry! Your request cannot be completed". Since the KSM is a machine and does not specify a 100% correlation, the end result and non-delivery of information could be interpreted to mean that the KO simply did not have the information that the KSM thought it did.

Step 65: IF the KO agrees to share the information with the KR, then the KSM delivers the information to the KR over the network.

Step 66: Optionally, the KSM generates a message and delivers it to the KO to ask the KO whether this information is of a nature that should be published so that it will be available to other people with appropriate access privileges through the publishing process.

Step 67: The KO makes a decision on the KSM's prompt message.

Step 68: IF the KO declines to publish, THEN returns the KSM with a "NO" message and the information is not published. In other words, although the KO agrees to share it with this specific KR in this specific time, the KO still wants to maintain his privilege to decline the next KR's request.

Step 69: IF the KO agrees to publish, THEN returns the KSM with a "YES" message and the KSM publishes the information in the published domain.

In all cases where the knowledge sharing reward tracking module 70 is enabled, the KSM tracks the number of requests for and subsequent delivery of listed or published information from the KO to the KR through the knowledge brokering process or through the automated publishing process. The tracked information will be used within a compensation system to reward members of the system for sharing knowledge.

Note that the comparison matching for data about items, events, or ideas (Correlation Index) and the comparison matching for people or contacts (Relationship Index) use the best available techniques such as context-based matching, neural networks, Bayesian classification, linear and non-linear classification, keyword matching, etc.

In the event that KO wants to remain anonymous, he can simply set the option by selecting from a dropdown list or clicking an icon.

Figure 9:
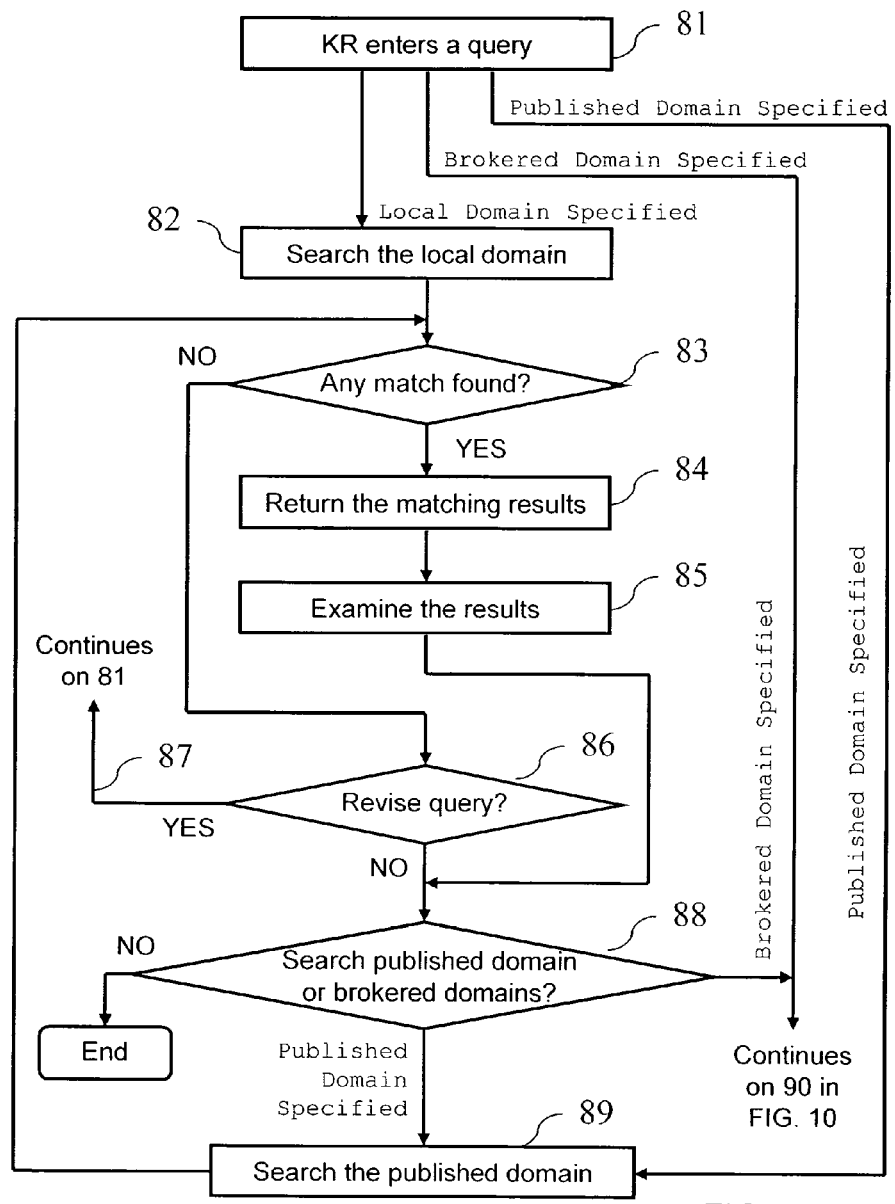
FIGS. 9-11 are flow diagrams illustrating a multi-domain process for sharing knowledge objects among the users of a computer network.
Figure 10:
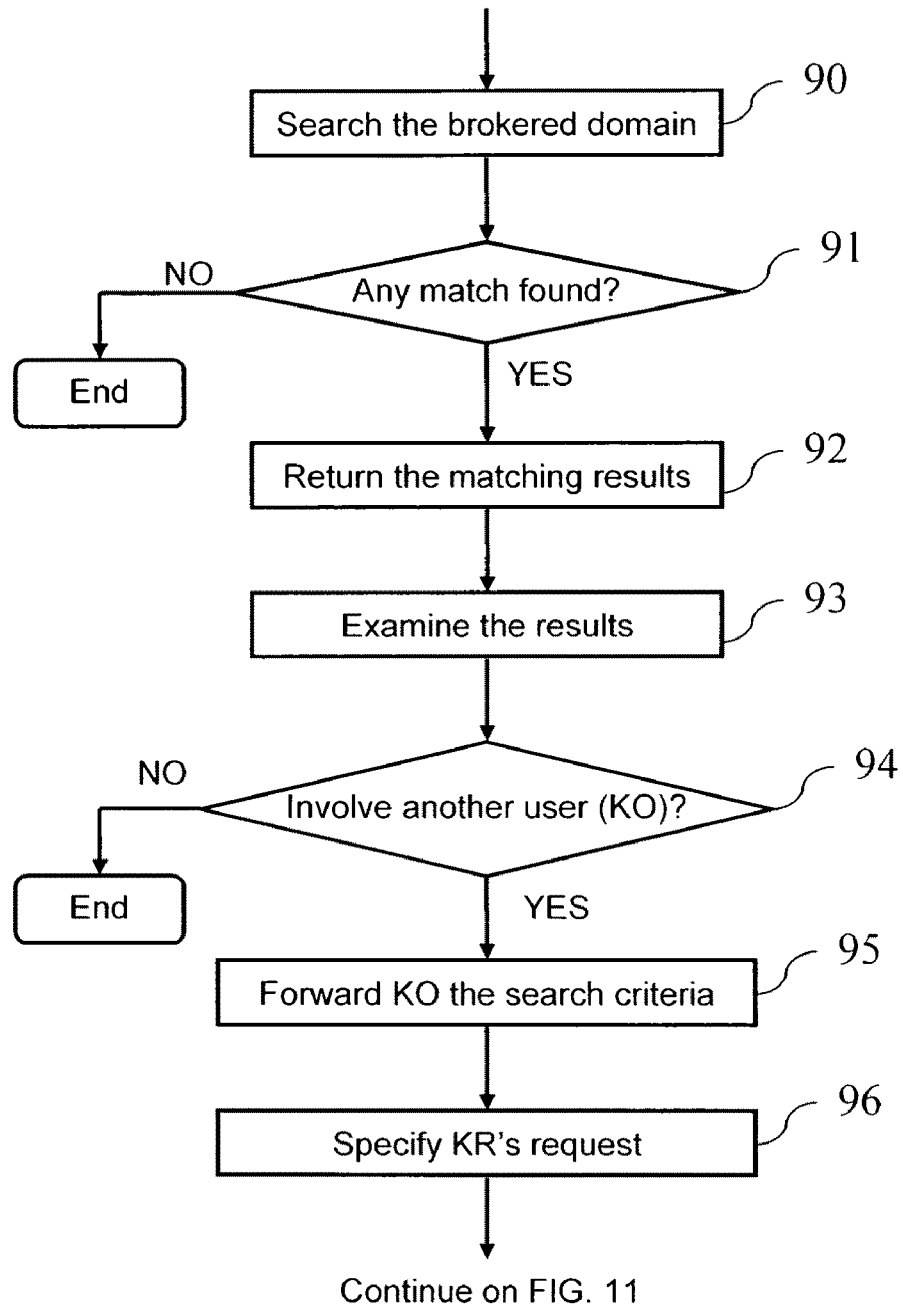
Figure 11:
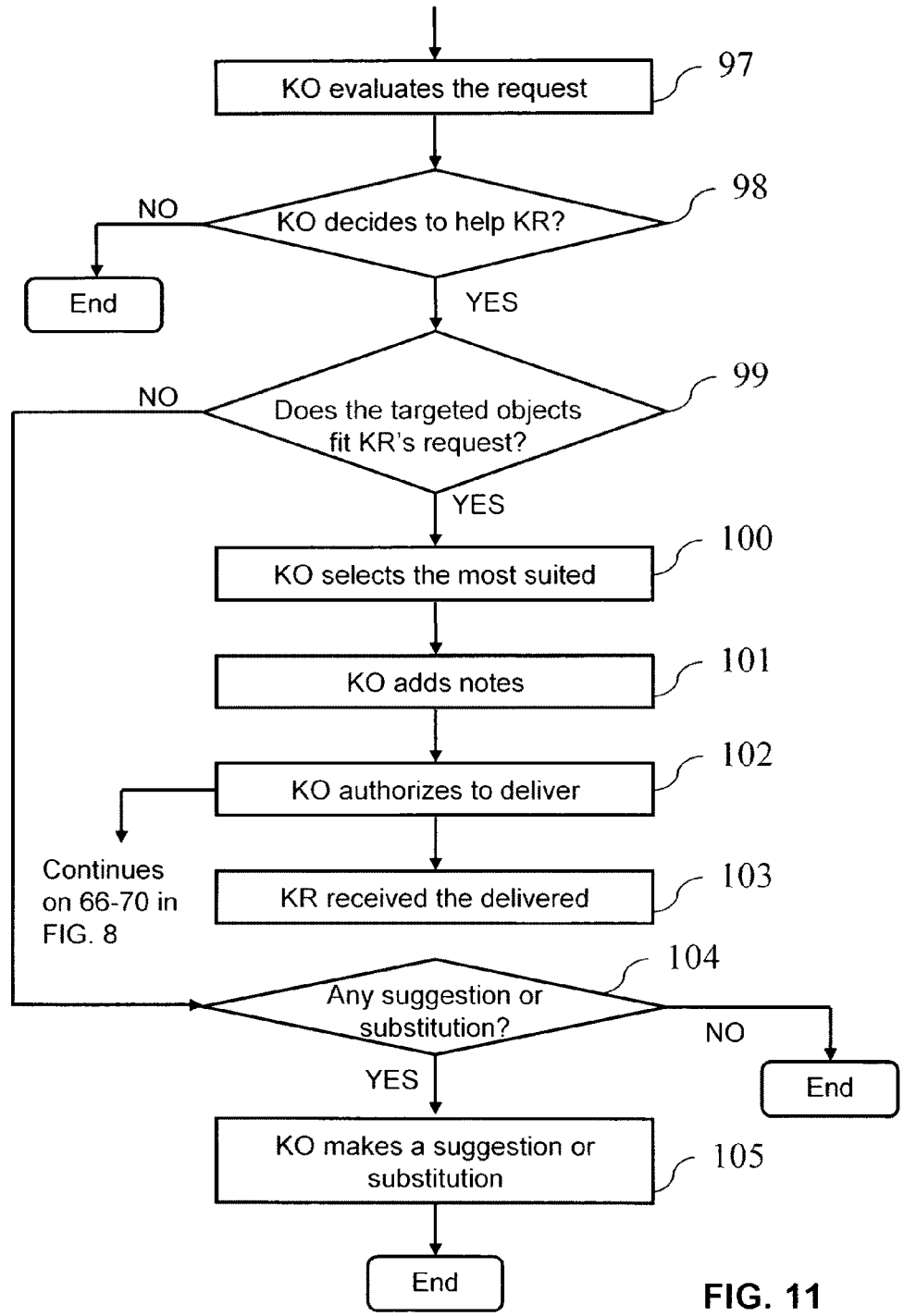
Figure 12:
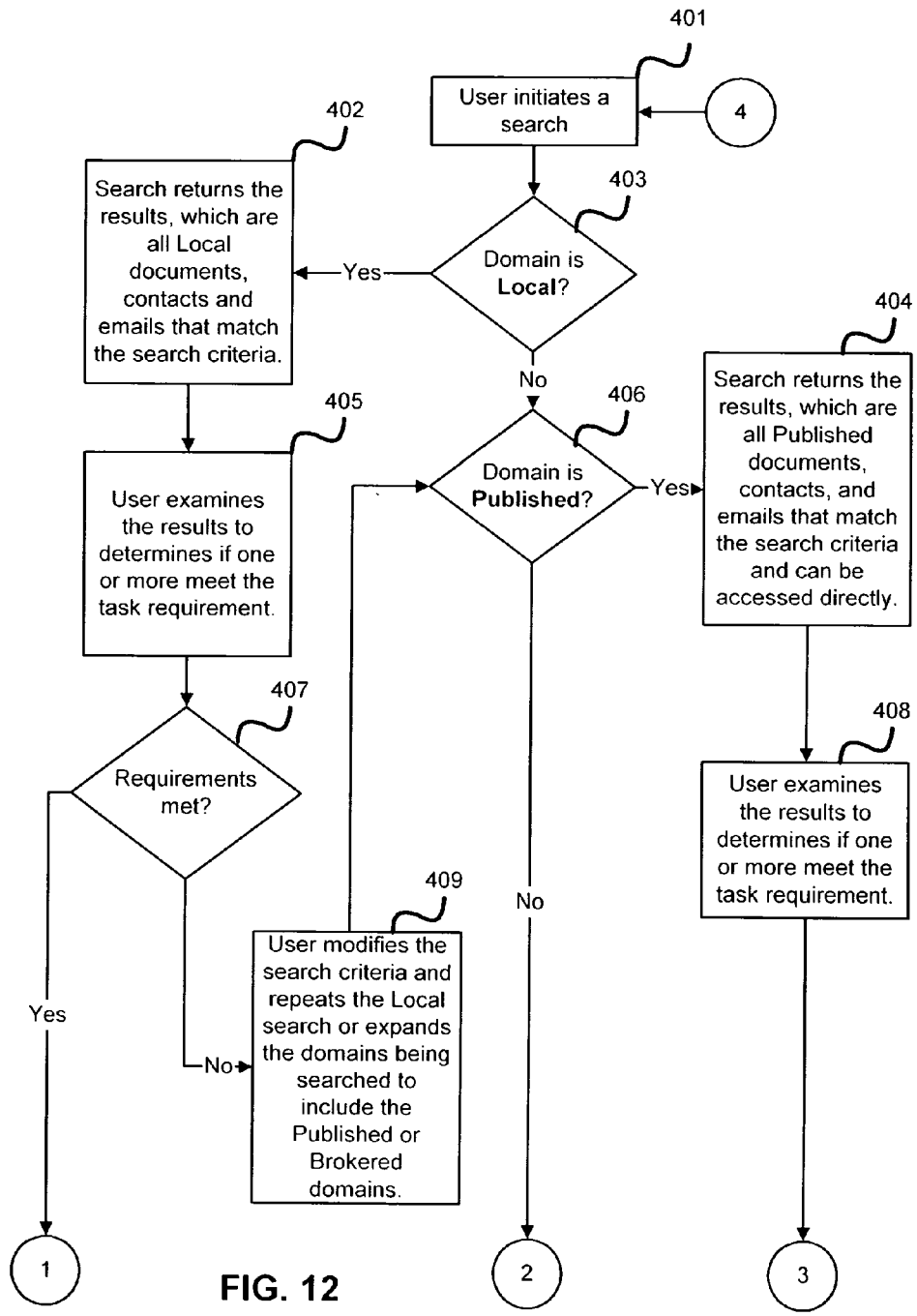
FIGS. 12-17 are flow diagrams illustrating a variant process comprising a comprehensive, multi-domain system for sharing knowledge objects and tracking utilization among the users of a computer network.
Figure 13:
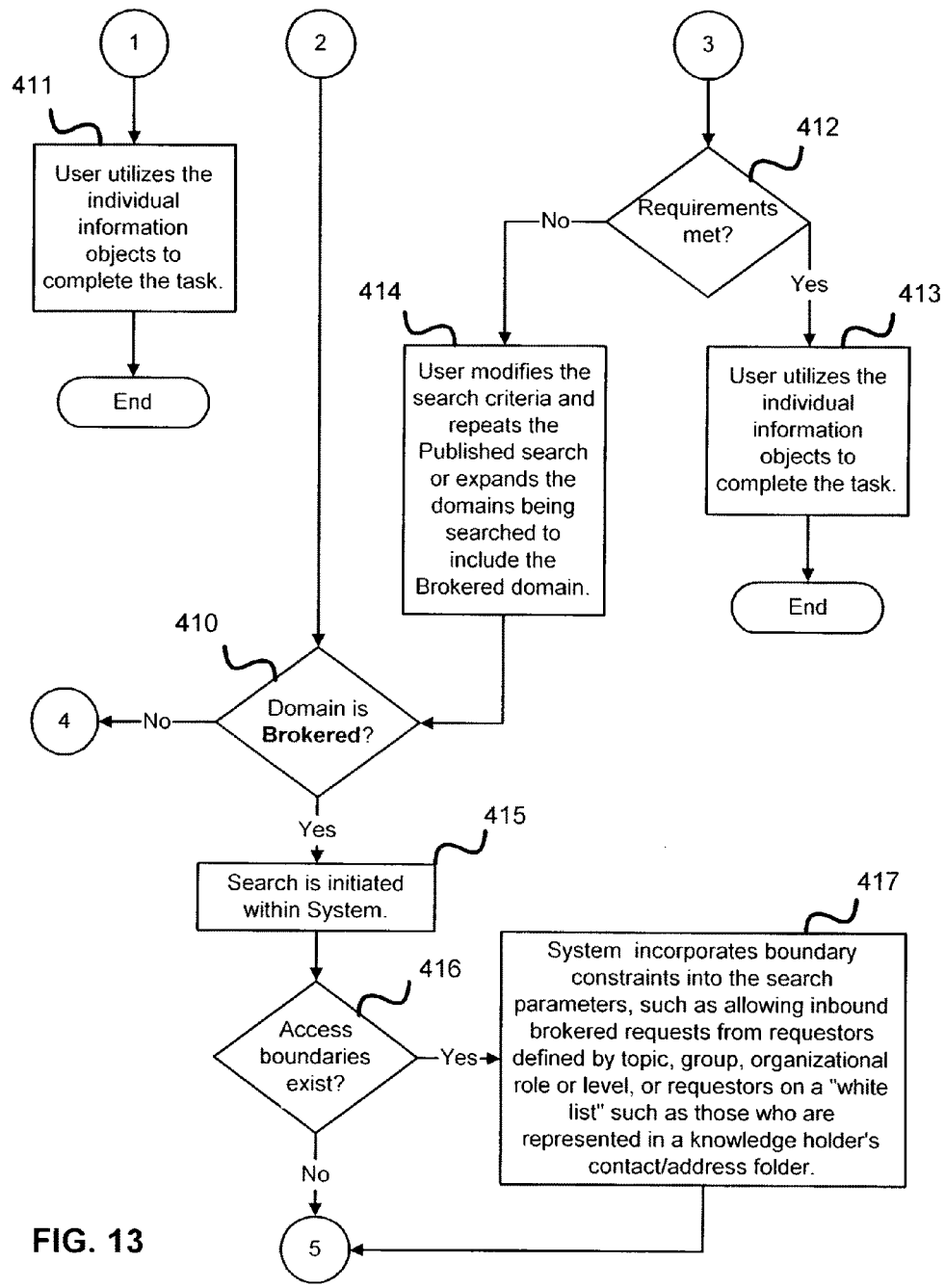
Figure 14:
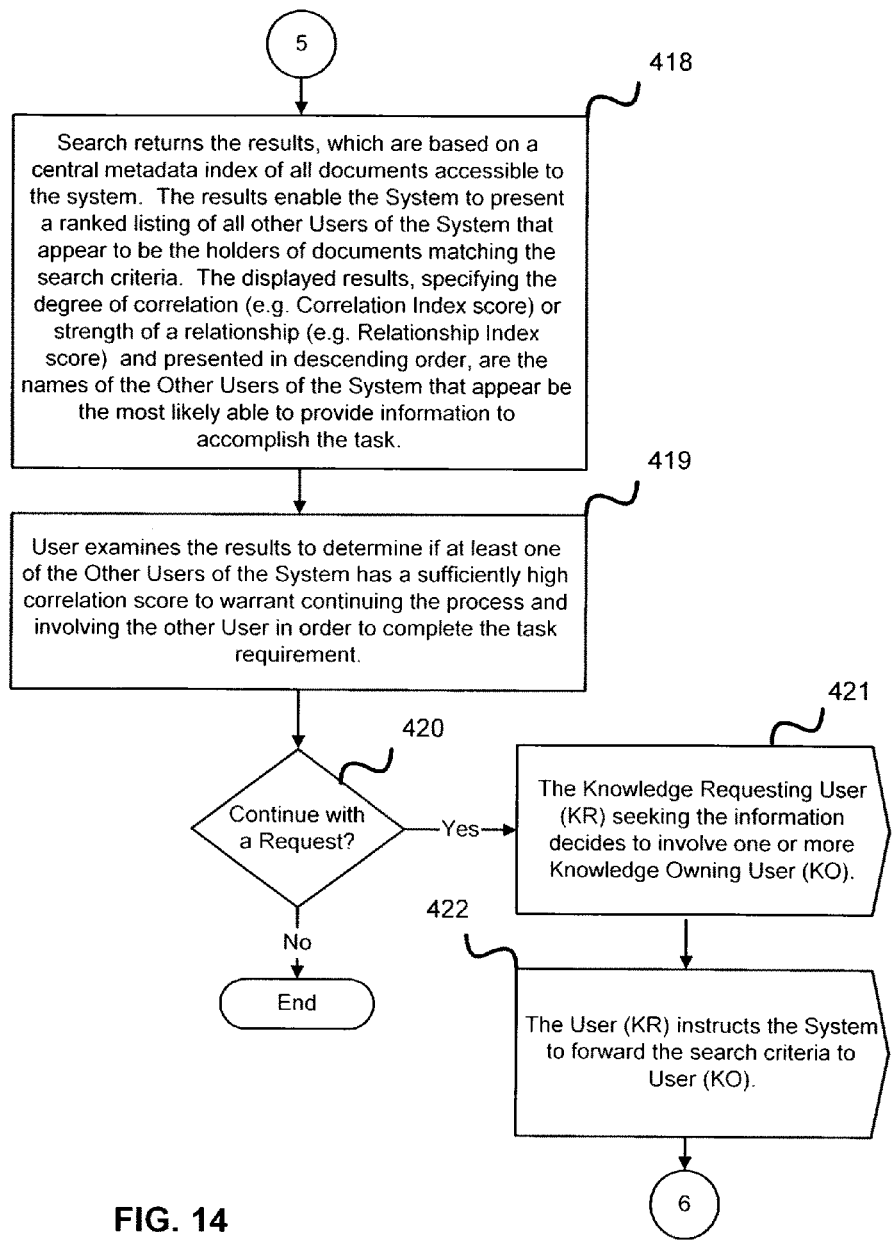
Figure 15:
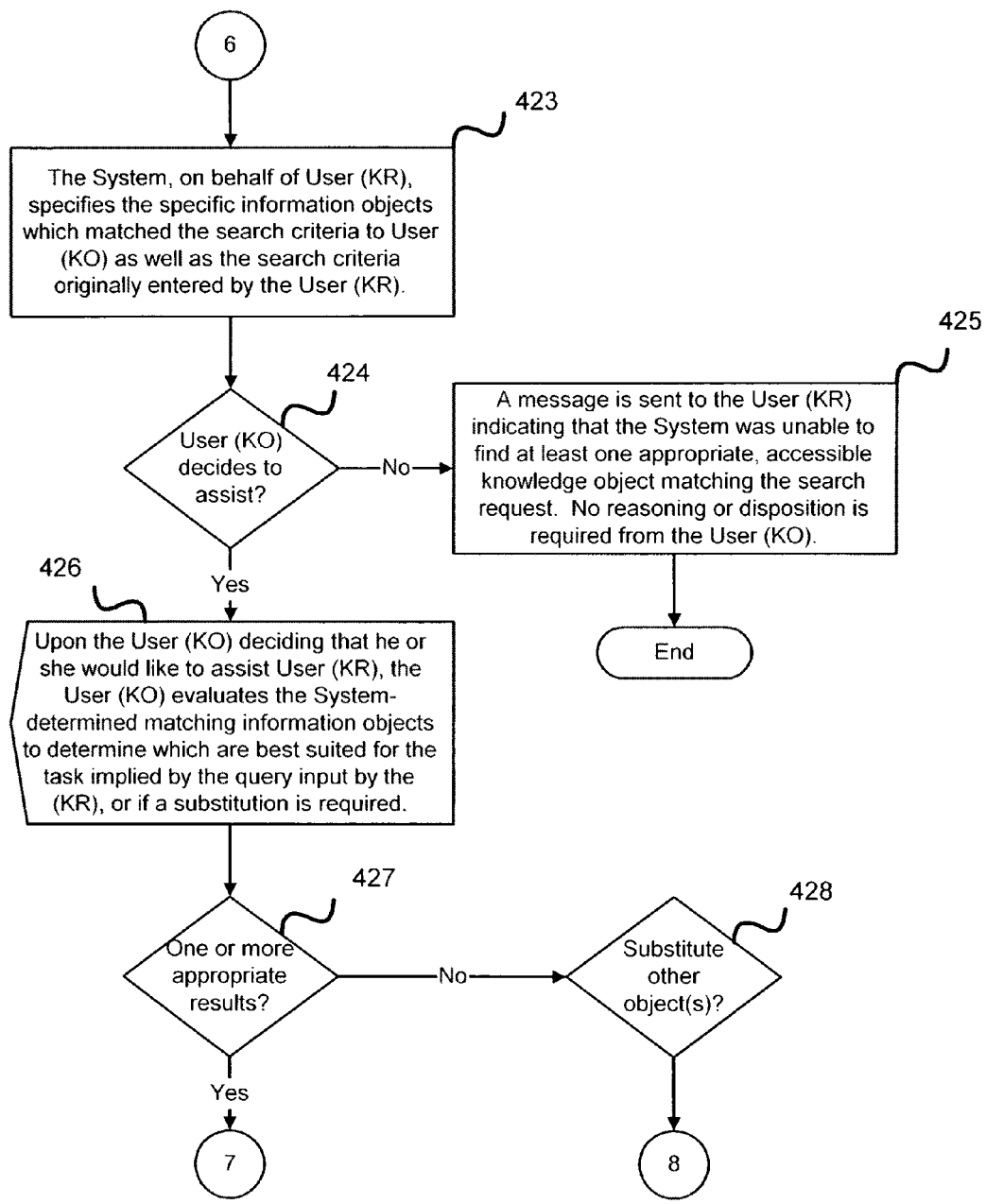
Figure 16:
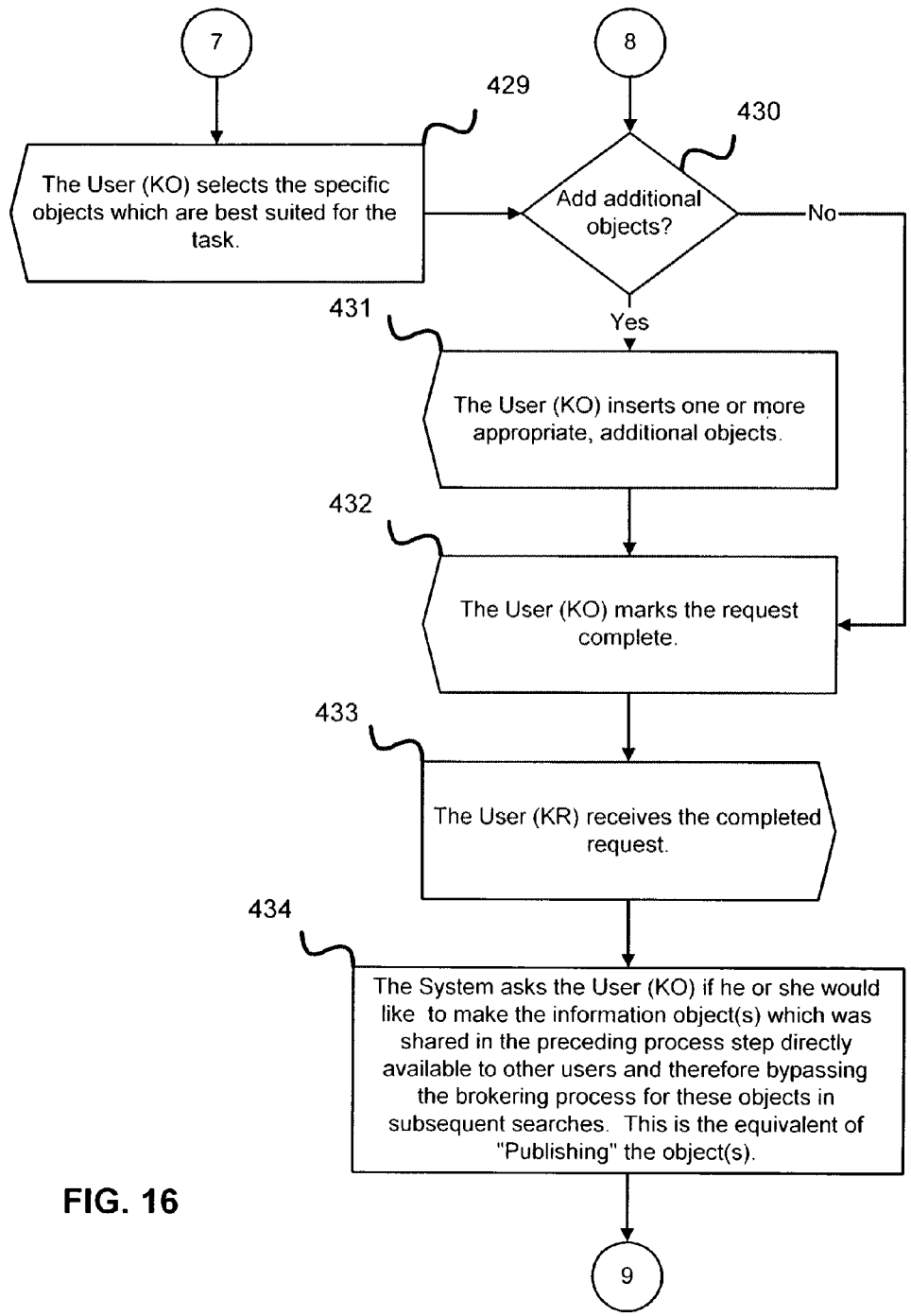
Figure 17:
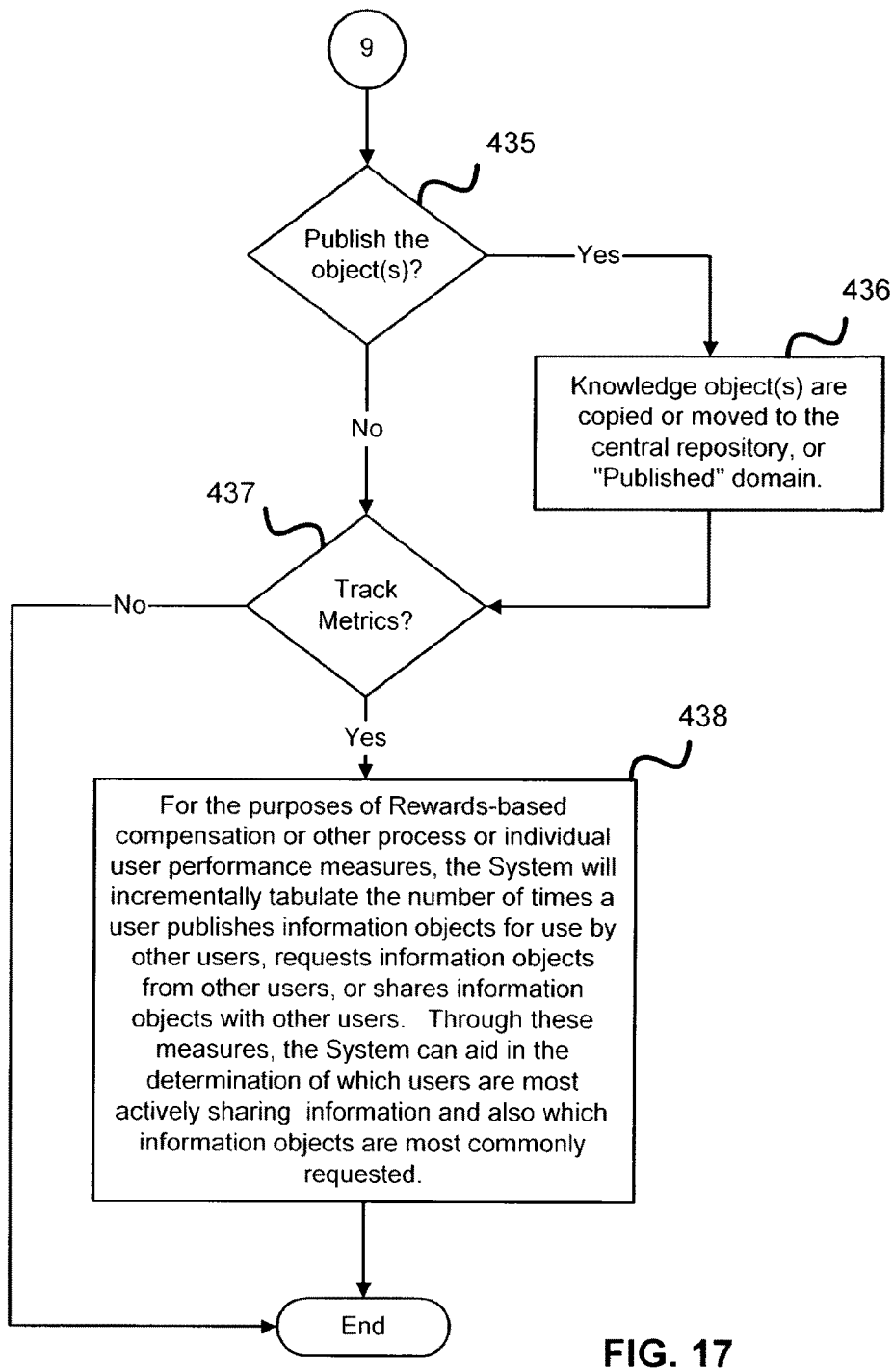

FIGS. 9-11 are flow diagrams illustrating a multi-domain process for a user using the KSM system described above. Assuming the user has configured the KSM to index all of his local files, e-mails and contacts on his computer, the process includes the following steps:

Step 81: Initiate a search. In order to complete a task, the user who is associated with the network initiates a search for information in a local client application interface of the KSM system by specifying and entering a keyword search criteria or a more advanced single field/value or multi-filed/values search criteria.

The graphical user interface of the KSM provides a number of search options, each of which is represented by a virtual button or other kind of icon. For example, the user may select "local domain search", "published domain search", "brokered domain search", or "search entire domains".

Step 82: If the local domain is specified, search the local domain.

For each user of the system, the local domain includes the user's digital information objects in the form of files, emails, contact records, and other digital representation of information, whether on a local machine or elsewhere on the network. The user has direct access to search the information through the system using core operating system directory structures and file-by-file contents search or through the system using a data index or meta-data system index representing the information and optimized for efficient searching. Note that the user can specify which digital information objects or collections of objects in the form of directories, connected systems, or other repositories that are searchable.

Step 83: Check whether any object, such as a document, contact or email, matches the search query.

Step 84: If the check result in Step 83 is yes, return to the user a list of matching objects.

Step 85: The user examines the returned results and decides whether or not to further search the published domain or the brokered domain.

Step 86: If the check result in Step 83 is no, prompt the user to revise the query.

Step 87: If the user decides to revise the query, repeat Step 81.

Step 88: If the user does not want to revise the query, prompt the user to further search the published domain or the brokered domain.

Step 89: Search the published domain if the user chooses so and continue on Step 83.

For each user of the system, the published domain includes the collective digital information objects in the form of files, emails, contact records and other digital representations of information, whether on local machines or on the network, which have been made available by the primary holders or originators of the information for direct access by other individual users of the system. Individual users of the system have direct access to search the collective digital information through the system using core operating system directory structures and file-by-file contents search or through the system using a data index or meta-data index representing the information and optimized for efficient searching. Individual users of the system can specify which digital information objects or collections of objects in the form of directories, connected systems or other repositories are searchable and accessible directly by other users of the system. Primary holders of the information can specify access rights and privileges granted to other users.

Step 90: Search the brokered domain if the user chooses so and continue on Step 91 in FIG. 9.

For each user of the system, the brokered domain includes the collective digital information objects in the form of files, emails, contact records and other digital representations of information, whether on local machines or on the network, which have been made available by the primary holders or originators of the information for indirect access by other individual users of the system.

Individual users of the system have indirect access to search the collective digital information through the system using core system directory structures and file-by-file contents search or through the system using a data index or meta-data index representing the information and optimized for efficient searching. The system is designed to identify and rank order individual users of the system as potential information providers and to facilitate the sharing of information between individual users. No user or system administrator shall be able to view this information directly because that would undermine the trust and privacy basis inherent in the system.

Individual users of the system can specify which digital information objects or collection of objects in the form of directories, connected systems or other repositories are searchable and accessible indirectly by other users of the system. Primary holders or originators of the information can specify access rights and privileges granted to other users. In a brokered sharing scenario, the process enables the holder of information who has been identified to another user of the system, by the system, as a likely provider of the information to make the final determination as to whether or not the information is shared.

Step 91: Check whether any object, such as document, contact or emails in the brokered domain matches the search query.

Step 92: If the check result in Step 91 is yes, return to the user a list of matching objects, which are based on a central meta-data index of all documents accessible to the system. The results enable the system to present a ranked listing of all other users of the system that appear to be the holders of documents matching the search criteria. The displayed results, specifying the degree of the correlation (or "core") and presented in descending order, for example, are the names of the other users of the system that appear to be the most likely able to provide information to accomplish the task.

Step 93: The user examines the returned results to determine if at least one of the individuals has a sufficiently high correlation score to warrant continuing the process and involving another user in order to complete the task requirement.

Step 94: The user or knowledge requester (KR) decides whether to involve another user or knowledge owner (KO).

Step 95: If yes, the system forwards the search criteria to the KO.

Step 96: The system, on behalf of the KR, specifies the specific information objects which matched the search criteria privately to the KO as well as the search criteria originally entered by the KR.

Step 97: The KO evaluates the KR's request and the system specified information objects to determine relevancy.

Step 98: The KO decides whether to be involved.

Step 99: If yes, the KO decides whether the system determined matching information objects are relevant to the task implied by the KR's request (query).

Step 100: The KO selects one or more most relevant object(s).

Step 101: Optionally, the KO may add notes, such as comments or instructions concerning the use of the selected object(s).

Step 102: The KO authorizes to deliver the selected objects attached with his notes.

Step 103: The KR receives the delivered copies of the information objects and the KO's notes. At the same time, the system generates a message and delivers it to the KO to ask the KO whether this information is of a nature that should be published so that it will be available to other people with appropriate access privileges through the publishing process. This is same as the situation in Step 66-70 described above.

Step 104: Optionally, if in Step 99 the KO thinks that the targeted information objects do not fit the KR's needs, the system may prompt the KO to provide substitution(s) or make a suggestion or provide comments via an instant messaging interface which is part of the KSM's graphical user interface.

Step 105: If the KO is willing to, he may make a suggestion such as selecting a relevant substitution object from his repository and offering to the KR.

FIGS. 12-17 are flow diagrams illustrating a variant process from that illustrated in FIGS. 9-11 and comprising a comprehensive, multi-domain system for sharing knowledge objects and tracking utilization among the users of a computer network. The user (KR) initiates a search (401) by selecting a search domain (403, 406 and 410). First, assume that the KR makes a local domain search. The KR is returned the search results, which are all local or private documents, contacts, and emails that match the search criteria (402). The KR examines the results (405) to determine if one or more meet the task requirement (407). If yes, the KR utilizes the individual information objects to complete the task (411). If no, the KR modifies the search criteria and repeats the local search or expands the domains being searched to include the published or brokered domains (409, 406).

When a published domain search is conducted, the KR is returned the results, which are all published documents, contacts, and emails that match the search criteria and can be accessed directly (404). Then, the KR examines the results (408) if one or more meet the task requirement (412). If yes, the KR utilizes the individual information objects to complete the task (413). If no, the KR modifies the search criteria and repeats the published search or expands the domains being searched to include the brokered domain (414).

When a brokered domain search is initiated (415), the system first checks whether access boundaries exists (416). If yes, the system incorporates boundary constraints into the search parameters, such as allowing inbound brokered requests from requestors defined by topic, group, organizational role or level, or requestors on a "white list" such as those who are represented in acknowledge holder's contact/address folder (417). If no access boundaries exist or after step 417, the KR is returned the results which are based on a central meta-data index of all documents accessible to the system (418). The results enable the system to present a prioritized list of the knowledge owners (KOs) that appear to be the holders of documents matching the search criteria. The displayed results, specifying the degree of correlation (or correlation index "score") and presented in descending order, are names of the other users of the system that appear to be the most likely able to provide information to accomplish the task. Then, the KR examines the results to determine if at least one of the other users of the system has a sufficiently high correlation score to warrant continuing the process and involving the other user(s) in order to complete the task requirement (419). Optionally, the system may prompt the KR whether to continue with a request (420). If yes, the KR instructs the system to forward the search criteria to the other user (422). The system, on behalf of the KR, specifies the specific information objects that matched the search criteria privately to the other user (KO) as well as the search criteria originally entered by the KR (423). When the KO receives the request, he needs to decide whether he wants to assist (424). If no, a message is sent to the KR indicating that the system was unable to find any appropriate knowledge object matching the search request (425). No reasoning or disposition is required from the user KO. If the KO wants to help the KR, the KO evaluates that the system generated matching information objects (426) to determine which are the best suited for the task implied by the query input by the KR (427) or if a substitution is required (428). If there exist one or more appropriate results, the KO selects the specific objects that are best suited for the task (429). If no, the KO may substitute other objects (428).

After step 428 or step 429, the KO may be prompted whether he wants to add additional objects (430). If no, the KO marks the request complete (432). If yes, the KO inserts one or more appropriate objects (431). The KR receives the completed request (433) and the system asks the KO if he wants to make the information object(s), which was shared in the preceding process step, directly available to other users and therefore bypassing the brokering process for these objects in subsequent searches (434, 435). If yes, the knowledge object(s) are copied or moved to the central repository (436). This is the equivalent of "publishing" the object(s). Optionally, it will be also decided whether to track metrics (437). For the purpose of rewards-based compensation or other process or individual user performance measures, the system will incrementally tabulate the number of times a user publishes information objects for use by other users and requests information objects from other users (438). Through these measures, the system can aid in the determination of which users are most actively sharing information and also which information objects are most commonly requested.

Note that in the steps of maintaining and updating a collection of listed knowledge objects, the list is a compilation of individual metadata "records" or compilations of data about data that correspond to the knowledge objects. The system includes a database of metadata records that describe the private knowledge objects that are in the control of the knowledge owners.

All participants in the system can access the list and therefore become aware of the "likely" holders of the information objects that they are seeking. Typically, a user does not know exactly what will be received—and therefore the system relies on and requires the human intervention and sorting of the potentially relevant objects to send back what is truly useful. The private repositories can exist on a local machine, or virtually anywhere, so long as they are available to the knowledge owner who is the person that grants access to them and facilitates their subsequent delivery to the knowledge seeker.

The system allows the users to set metadata at a folder level (like an email or desktop folder) and also to assign to that folder some rules. For example, a first user might have an email folder called patent that is automatically published and for which the access rights are set to only allow a second user to see the files. Whenever the first user drags an email to that folder, it is moved to the server and then the second user could find it in a search for "published".

In a typical employment, the server of the system manages the access to, and central storage of, the published records. It also manages the central list (index) of individual metadata records about private knowledge objects. It may further manage the various rewards-tracking metrics and their subsequent aggregation/reporting/dissemination. More importantly, the server is omniscient. No user can know what individual users have in their private repository.

If an object is changed from private to published, it gets moved to the CKOR. If it is changed from published to private, the metadata record is still managed by the server but the actual knowledge object is no longer directly accessible. The object, from that point on, resides within the control of the knowledge owner (in the DKOR).

In this system, a user must be able to search the user's local repository ("My Computer"), the central repository of directly accessible information ("Published"), and the distributed, request-shared repositories as represented by the central list ("Brokered"). The system wouldn't work if any part was missing, because the three concentric circles are what make it work. A car works because it has wheels, an engine, and a steering mechanism. A knowledge sharing systems works when it has these three things.

The system has a unique way for publishing to be linked with brokering. Once a brokered request is completed, a sharer may decide that the information shared was not worth keeping so privately. The user can then just mark it as published and it gets moved to the central repository of directly accessible information. When an object changes from "published" to brokered, the system removes the object from the central repository of directly accessible information and retains the metadata describing the object in the central repository index, or list.

Also note that the list, and the way the list is structured, can contain both items that are derived directly from the objects themselves (keywords) and also by the knowledge owner that imbues the knowledge with additional descriptive data so that it can be found. The list of available descriptive criteria or "tags" can be from a standardized taxonomy. In other words, the system according to this invention allows metadata to be specified by a user to in a standard taxonomy for user-assigned, essentially a central vocabulary, and to be automatically assigned by the system as it gathers metadata from emails, etc.

The user-defined taxonomy is maintained on the server via a browser. The user can edit standard taxonomy metadata within their own documents if the server is set to allow such editing. In some deployments, the users can even add new types/classifying criteria choices to the central standard taxonomy.

The invention described above has numerous real-world applications across industries and organizational structures, and can essentially be used any time when people can benefit from sharing knowledge. These include but are not limited to collaboration in the following industries and organizational structures:

general business (e.g. email-based, owner-brokered document, contact, and file sharing);
manufacturing (e.g. collaborative design across any distance or spanning companies);
software development (e.g. source code sharing, testing, bug tracking, information security);
scientific research (e.g. research methods or results sharing);
academic learning (e.g. course material publishing, research results sharing, distance learning);
military (e.g. intelligence gathering, anti-espionage);
financial (e.g. research publishing, research data gathering);
medical (e.g. clinical trials, patient record/clinical case sharing); and community (e.g. contact sharing amongst groups, photo-sharing).

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A computer-implemented process for use in a computer network that includes at least two computers communicatively coupled to each other, the process comprising the steps of:

(a) accepting a first user's request;
(b) searching a local knowledge object repository comprising local knowledge each of the local knowledge objects being associated with the first user;
(c) searching a central knowledge object repository comprising contributed knowledge objects;
(d) returning to the first user a list of links for all matching local and contributed knowledge objects, said matching local and contributed knowledge objects being marked either local or published or listed;
(e) allowing access to said matching local and contributed knowledge objects if the first user chooses a knowledge object marked local or published;
(f) forwarding the first user's request to a second user and prompting the second user for authorization of access if the first user chooses a knowledge object marked listed from the list, the second user having control of access to the knowledge object marked listed object;
(g) returning to the first user the chosen knowledge object marked listed if the second user allows access;
(h) notifying the first user that the request is not completed if the second user declines access to the listed knowledge object.

2. The process of claim 1, wherein the first user initiates a request by any of:
entering a query; and
clicking a link in a directory.

3. The process of claim 1, wherein the second user has the option to be either anonymous or identifiable.

4. The process of claim 1, wherein the step (e) further comprises the step of: prompting the first user to enter a correct user identification.

5. The process of claim 1, wherein the step (f) further comprises the step of:
requiring a sufficiently specific query so that a request cannot be forwarded to the second user until the search request is sufficiently specific so that it yields a finite, manageable set of results.

6. The process of claim 1, wherein the step (g) further comprises the step of: prompting the second user to add a message for the first user.

7. The process of claim 1, wherein the step (g) further comprises the step of: prompting the second user to publish the chosen listed knowledge object.

8. The process of claim 1, wherein the step (f) further comprises the step of:
prompting the second user to provide a substitution if the second user determines that the chosen listed knowledge object is irrelevant or sub optimal for the task indicated in the first user's request.

9. The process of claim 8, further comprising any step of:
returning to the first user a local knowledge object from the second user's local domain if the second user so decides; and
prompting the second user to mark the local knowledge object as published.

10. The process of claim 9, further comprising any step of:
tracking the number of times a user discloses a local knowledge object as a listed knowledge object;
tracking the number of times a user authorizes other users' access to a listed knowledge object;
tracking the number of times a user publishes knowledge objects;
tracking the number of times a published knowledge object is utilized by the users other than the user who contributed the published knowledge object; and
tracking the number of times a user utilizes knowledge objects originating from other users;
wherein said numbers are used in determining a reward to the user for the user's involvement in knowledge sharing.

11. A computer readable storage medium containing instructions in computer readable form for carrying out a process for promoting information and knowledge sharing among the users registered to a computer network, the process comprising:

(a) receiving a first user's request;
(b) causing a search of searching-a local knowledge object comprising local, accessible knowledge objects associated with the first user;
(c) causing a search of a central knowledge object repository comprising and all contributed knowledge objects associated with other users;
(d) returning to the first user a list of links for all matching local and contributed knowledge objects, said matching local and contributed knowledge objects being marked either local or published or listed;
(e) allowing access to said matching local and contributed knowledge objects if the first user chooses a knowledge object marked local or published;
(f) forwarding the first user's request to a second user and prompting the second user for authorization of access if the first user chooses a knowledge object marked listed from the list, the second user having control of access to the knowledge object marked listed object;
(g) allowing access by the first user to the chosen listed knowledge object if the second user allows access;
(h) notifying the first user if the second user declines access to the listed knowledge object.

12. The computer readable storage medium of claim 11, wherein the first user initiates a request by any of:
entering a query; and
clicking a link in a directory.

13. The computer readable storage medium of claim 12, wherein the first user initiates the request either anonymously or identifiably.

14. The computer readable storage medium of claim 11, wherein the second user elects to be identified in the system either anonymously or identifiably.

15. The computer readable storage medium of claim 11, wherein the step (e) further comprises the step of:
prompting the first user to enter a correct user identification.

16. The computer readable storage medium of claim 11, wherein the step (g) further comprises the step of: prompting the second user to add a message for the first user.

17. The computer readable storage medium of claim 6, wherein the step (g) further comprises the step of:

prompting the second user to publish the chosen listed knowledge object.

18. The computer readable storage medium of claim 11, wherein the step (f) further comprises the step of:

prompting the second user to make a suggestion if the second user thinks that the chosen listed knowledge object is irrelevant to the first user's request.

19. The computer readable storage medium of claim 18, further comprising any step of:

returning to the first user an unlisted knowledge object from the second user's private domain if the second user so decides; and prompting the second user to make the unlisted knowledge object as listed or published.

20. The computer readable storage medium of claim 19, further comprising any step of:

tracking the number of times a user discloses a local knowledge object as a listed knowledge object;

tracking the number of times a user authorizes other users' access to a listed knowledge object;

tracking the number of times a user publishes knowledge objects;

tracking the number of times a published knowledge object is utilized by the users other than the user who contributed the published knowledge object; and tracking the number of times a user utilizes knowledge objects originating from other users;

wherein said numbers are used in determining a reward to the user for the user's involvement in knowledge sharing.

* * * * *